United States Patent [19]

Kuwabara et al.

[11] Patent Number: 5,130,341
[45] Date of Patent: Jul. 14, 1992

[54] PROCESS FOR THE PRODUCTION OF FOAMED POYMER PARTICLES

[75] Inventors: Hideki Kuwabara; Kazuo Tsurugai; Masaharu Oikawa, all of Utsunomiya, Japan

[73] Assignee: JSP Corporation, Tokyo, Japan

[21] Appl. No.: 796,606

[22] Filed: Nov. 22, 1991

[30] Foreign Application Priority Data

Nov. 22, 1990 [JP] Japan .................. 2-319862

[51] Int. Cl.$^5$ .............................. C08J 9/18
[52] U.S. Cl. ...................... 521/60; 521/56; 521/91; 521/143
[58] Field of Search ..................... 521/56, 60

[56] References Cited

U.S. PATENT DOCUMENTS 4,937,271  6/1990  Akamatsu et al. ............... 521/60
4,968,723 11/1990  Senda et al. ..................... 521/60

*Primary Examiner*—Morton Foelak
*Attorney, Agent, or Firm*—Sherman and Shalloway

[57] ABSTRACT

Disclosed herein is a production process of foamed polymer particles, wherein particles of a polymer, which contain a silica-alumina absorbent in which the molar ratio of $SiO_2Al_2O_3$ is at least 1.15:1 are dispersed in a dispersion medium in the presence of carbon dioxide in a closed vessel, the resultant dispersion is heated to a temperature not lower than the softening temperature of the polymer to impregnate the polymer particles with carbon dioxide, and the polymer particles and the dispersion medium are then released into an atmosphere of a pressure lower than the internal pressure of the vessel, thereby expanding the polymer particles. The polymer may be an uncrosslinked propylene polymer, uncrosslinked, linear low-density polyethylene or crosslinked polymer.

9 Claims, 1 Drawing Sheet

PROCESS FOR THE PRODUCTION OF FOAMED POYMER PARTICLES

BACKGROUND OF THE INVENTION

1) Field of the Invention

The present invention relates to a production process of foamed polymer particles.

2) Description of the Related Art

As a foaming process of polymer particles, it has been known to disperse polymer particles containing a volatile foaming agent in a dispersion medium such as water in a closed vessel, to heat the resultant dispersion to a temperature of at least the softening temperature of the polymer particles while maintaining the internal pressure of the vessel at least the vapor pressure of the foaming agent, and then to open the vessel at one end thereof so as to release the polymer particles and the dispersion medium into an atmosphere of a pressure lower than the internal pressure of the vessel. As volatile foaming agents useful in the practice of this process, there have heretofore been used mainly hydrocarbons such as propane, butane and pentane, halogenated hydrocarbons such as trichlorofluoromethane and dichlorodifluoromethane, etc. However, most of these compounds used as the foaming agents have been accompanied by problems of possible hazards such as toxicity and combustibility, of ozonosphere destruction like flons, of impracticability due to their expensiveness, and/or the like. Besides, the volatile foaming agents swell the polymer particles, so that the appropriate range of foaming temperatures upon their foaming is limited. Therefore, they also involve a problem that the foaming temperature greatly affects the expansion ratio of the polymer particles, so that difficulties are encountered on controlling of the expansion ratio.

Many studies have been made to solve such problems. As also disclosed in a method proposed previously by the present applicant, it has also been performed in recent years to use an inorganic gas such as carbon dioxide as a foaming agent (for example, Japanese Patent Publication No. 61227/1987, Japanese Patent Application Laid-Open Nos. 2741/1986 and 4738/1986, etc.).

As described in the above-mentioned publications, it is possible to obtain foamed polymer particles by using an inorganic gas such as carbon dioxide as a foaming agent. However, the use of carbon dioxide as a foaming gent involves a problem that the improvement in expansion ratio is not recognized though an equilibrium pressure within a closed vessel is higher compared with the case making use of a general volatile foaming agent, and the equilibrium pressure within the vessel becomes still higher when making an attempt to increase the expansion ratio. It is hence required to use a vessel capable of withstanding higher pressures as the closed vessel, leading to increase of the cost of equipment. The mere replacement of the volatile foaming agent with carbon dioxide offers little problem so long as polymer particles in a small amount on the order of an experimental scale are caused to expand. However, the expansion ratio lowers as the time goes on from the beginning of foaming if the polymer particles in a great amount on the order of an industrial scale are attempted to expand. For example, the expansion ratio is about 20–30 times at the beginning of foaming, but is lowered to about 10 times near the end of foaming. The scatter of expansion ratio hence becomes very wide. Therefore, such production of foamed particles on the industrial scale has involved some problems to have to solve.

SUMMARY OF THE INVENTION

The present invention has been completed with a view toward solving the above-described problems, and has its object the provision of a process for the production of foamed polymer particles, which can obtain foamed polymer particles high in expansion ratio and narrow in scatter of expansion ratio with ease even when carbon dioxide is used as a foaming agent to produce the foamed particles on an industrial scale.

The present inventors have carried out an extensive investigation with a view toward solving the above-described problems. As a result, it has been found that when polymer particles containing a silica-alumina adsorbent in which the molar ratio of $SiO_2/Al_2O_3$ is at least 1.15:1 are impregnated with carbon dioxide to expand the polymer particles, foamed particles high in expansion ratio and narrow in scatter of expansion ratio can be obtained with ease, leading to completion of the present invention.

In one aspect of this invention, there is thus provided a process for the production of foamed polymer particles, which comprises dispersing particles of a polymer, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel, thereby expanding the polymer particles.

In another aspect of this invention, there is provided a process for the production of foamed polymer particles, which comprises dispersing particles of an uncrosslinked propylene polymer, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel at a temperature within a range of from (the melting point of the polymer−5° C.) to (the melting point+15° C.), thereby expanding the polymer particles.

In a further aspect of this invention, there is provided a process for the production of foamed polymer particles, which comprises dispersing particles of an uncrosslinked, linear low-density polyethylene, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel at a temperature within a range of from (the melting point of the polymer−10° C.) to (the melting point+5° C.), thereby expanding the polymer particles.

In still a further aspect of this invention, there is provided a process for the production of foamed polymer particles, which comprises dispersing particles of a crosslinked polymer, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel at a temperature not lower than the melting point of the polymer prior to crosslinking, thereby expanding the polymer particles.

According to the present invention, the following advantageous effects have been brought about. Since the polymer particles containing a silica-alumina adsorbent are impregnated with carbon dioxide, the scatter of expansion ratio becomes very narrow even when carbon dioxide is used as a foaming agent. There is hence no potential problem that a large difference in expansion ratio arises between foamed particles obtained right after the beginning of the foaming process and near the end of the foaming process even in the case where the foamed particles are mass-produced on an industrial scale. It is therefore possible to produce excellent foamed particles. In addition, the use of the specific polymer particles containing the silica-alumina adsorbent in which the molar ratio of $SiO_2/Al_2O_3$ is at least 1.15:1 permits the provision of foamed particle having an expansion ratio higher than those obtained by the conventional method making use of carbon dioxide as a foaming agent though equal amounts of carbon dioxide are used. It is therefore possible to lower the pressure within a closed vessel compared with the conventional method to obtain foamed particles of the same expansion ratio. For this reason, it is not necessary to make a fresh equipment investment such that a closed vessel having higher pressure resistance is provided when the process of the present invention is used industrially. Therefore, foamed particles having a high expansion ratio can be obtained using the conventional equipment. Moreover, excellent foamed particles can be provided at a lower cost.

BRIEF DESCRIPTION OF THE DRAWINGS

The above and other objects, features and advantages of the present invention will becomes apparent from the following description of the invention and the appended claims, taken in conjunction with the accompanying drawings, in which:

DETAILED DESCRIPTION OF THE INVENTION AND PREFERRED EMBODIMENTS

Figure 1:
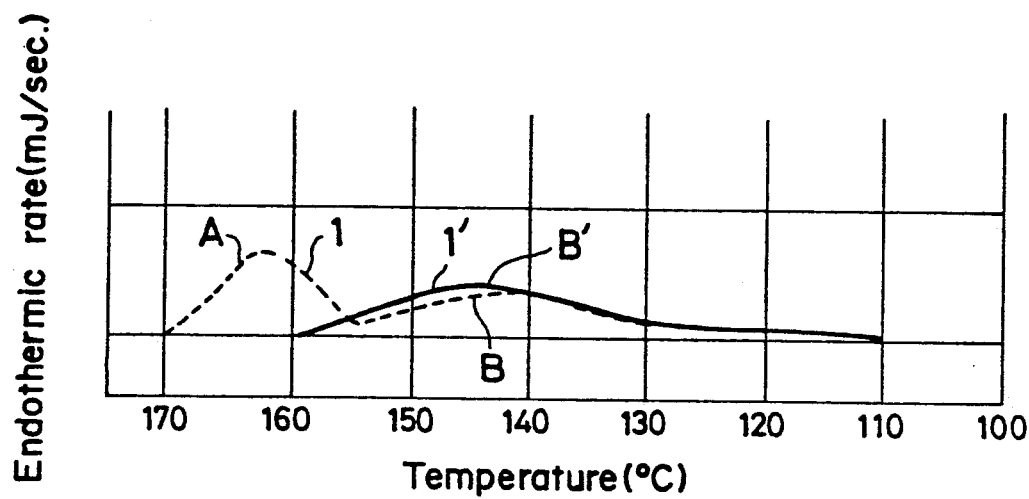
FIG. 1 shows a DSC curve of foamed particles containing secondary crystals therein.

As exemplary polymer particles useful in the practice of this invention, may be mentioned particles of propylene polymers such as propylene homopolymer, propylene-ethylene random copolymers, propylene-ethylene block copolymers, propylene-butene random copolymers and propylene-ethylene-butene random copolymers; particles of ethylene polymers such as high-density polyethylene, branched low-density polyethylene and linear low-density polyethylenes which are copolymers of ethylene and a small amount of an α-olefin (number of carbon atoms: 4, 6, 8, etc.); and the like. Of these, the propylene polymers such as the propylene-ethylene random copolymers, propylene-butene random copolymers and propylene-ethylene-butene random copolymers, the high-density polyethylene, the branched low-density polyethylene, and the linear low-density polyethylenes are particularly preferred.

As exemplary silica-alumina adsorbents contained in the polymer particles to be impregnated with carbon dioxide, may be mentioned adsorbents containing silica gel as a predominant component, zeolites and the like. In this invention, it is however essential to use an adsorbent in which the molar ratio of $SiO_2/Al_2O_3$ is at least 1.15:1, preferably at least 1.18:1. It is preferable to control the upper limit of such a molar ratio to 50:1. The use of an adsorbent having an $SiO_2/Al_2O_3$ ratio lower than 1.15:1 will result in foamed polymer particles free from the significant improvement in expansion ratio. These adsorbents may be used either singly or in combination. These adsorbents may be added to a polymer upon its granulation or pelletization. The adsorbent is generally added in the form of powder or particles. No particular limitation is imposed on the particle size. It is however preferable to use an adsorbent having a particle size of, generally, 50 μm or smaller, particularly, 0.1–10 μm. It is desirable to add the silica-alumina adsorbent in such a manner that it is contained in a proportion of 0.01–10 parts by weight, particularly, 0.1–1 part by weight per 100 parts by weight of the polymer. If the adsorbent would be contained in a too excessive amount, the resulting foamed particles will become liable to deteriorate mutual fusion bonding upon their molding. On the other hand, the addition of the adsorbent in a too little amount will bring about no effect of this invention.

The polymer particles used in this invention and containing the adsorbent therein preferably have a particle size of, generally, 0.1–10 mm, particularly, 0.5–5 mm. When the silica-alumina adsorbent is contained in the polymer particles, carbon oxide becomes liable to be impregnated into the polymer particles and moreover, the formation of secondary crystals, which will be described subsequently, can be facilitated. It is therefore possible to obtain foamed polymer particles high in expansion ratio with ease.

In this invention, the step in which carbon dioxide is impregnated into the polymer particles is performed at the same time as a step wherein the polymer particles are dispersed in a dispersion medium in a closed vessel. In this case, carbon dioxide is once dissolved or dispersed in the dispersion medium and then impregnated into the polymer particles. Carbon dioxide is impregnated into the polymer particles by, for example, placing the polymer particles, carbon dioxide and dispersion medium in the closed vessel and then heating the contents to at least the softening temperature of the polymer while stirring them under pressure. Carbon dioxide may be used in any form of gas, liquid and solid such as dry ice. In general, the amount of carbon dioxide to be used is preferably 5–50 parts by weight per 100 parts by weight of the polymer particles containing the adsorbent.

As exemplary dispersion media, may be mentioned those not dissolving the polymer particles therein, for example, water, ethylene glycol, glycerol, methanol, ethanol and the like. Water is however used in general.

An anti-fusing agent may be added to the dispersion medium for the prevention of fusion bonding among the polymer particles when the polymer particles containing the adsorbent are dispersed in the dispersion medium in the presence of carbon dioxide and the resultant dispersion is then heated. Any anti-fusing agents may be used as such an anti-fusing agent, irrespective of inorganic and organic agents so long as they do neither dissolve in the dispersion medium such as water nor melt upon the heating. However, inorganic anti-fusing agents are preferred in general. As exemplary inorganic anti-fusing agents, may be mentioned tricalcium phosphate, magnesium pyrophosphate and the like. It is preferable to add such an agent in combination with an emulsifier. As such an emulsifier, may suitably be used an anionic surface active agent such as sodium dodecylbenzenesulfonate or sodium oleate. The particle size of the anti-fusing agent is preferably 0.001-100 $\mu$m, particularly, 0.001-30 $\mu$m. The amount of the anti-fusing agent to be used is preferably 0.01-10 parts by weight per 100 parts by weight of the polymer particles in general. It is also preferable to add the emulsifier in a proportion of 0.01-5 parts by weight per 100 parts by weight of the polymer particles in general.

In this invention, it is desirable that secondary crystals should be present in the foamable polymer particles impregnated with carbon dioxide (with the proviso that the polymer particles are not crosslinked). The existence of the secondary crystals in the foamable polymer particles results in foamed polymer particles excellent in moldability. When the polymer particles are composed of an uncrosslinked polypropylene resin or uncrosslinked, linear low-density polyethylene resin in particular, the existence of the secondary crystals in the foamable polymer particles is advantageous. The presence of the secondary crystals can be determined by whether a high-temperature peak on the temperature side higher than a temperature corresponding to an inherent peak caused by absorption of heat upon so-called melting of a polymer appears on a DSC curve obtained by differential scanning calorimetry of the resultant foamed polymer particles or not. The inherent peak and the high-temperature peak can be determined by conducting the differential scanning calorimetry twice on one and the same sample. Namely, 1-3 mg of the sample (foamed polymer particles) is first of all heated to 220° C. at a heating rate of 10° C./min by a differential scanning calorimeter to obtain a first DSC curve. The sample is then cooled from 220° C. to about 40° C. at a cooling rate of 10° C./min and is heated again to 220° C. at a heating rate of 10° C./min, thereby obtaining a second DSC curve. The inherent peak and high-temperature peak can be determined by comparing the two DSC curves thus obtained with each other. The term "inherent peak" as used herein means an endothermic peak attendant on the so-called melting of the foamed polymer particles and hence appears not only on the first DSC curve but also on the second DSC curve. The temperatures corresponding respectively to the tops of these peaks on the first and second DSC curves may differ a little in some instances. Their difference is however smaller than 5° C., usually, smaller than 2° C. On the other hand, the term "high-temperature peak" as used herein means an endothermic peak which appears on the temperature side higher than the above-described inherent peak on the first DSC curve. The presence of the secondary crystals is ascertained by the appearance of this high-temperature peak. When the high-temperature peak does not substantially appear, it is determined that no secondary crystals exist. In the above-described two DSC curves, it is desirable that a greater difference arises between the temperature corresponding to the top of the inherent peak appearing on the second DSC curve and the temperature corresponding to the top of the high-temperature peak appearing on the first DSC curve. It is preferable that the difference between these temperatures is at least 5° C., particularly, 10° C. or higher.

Figure 2:
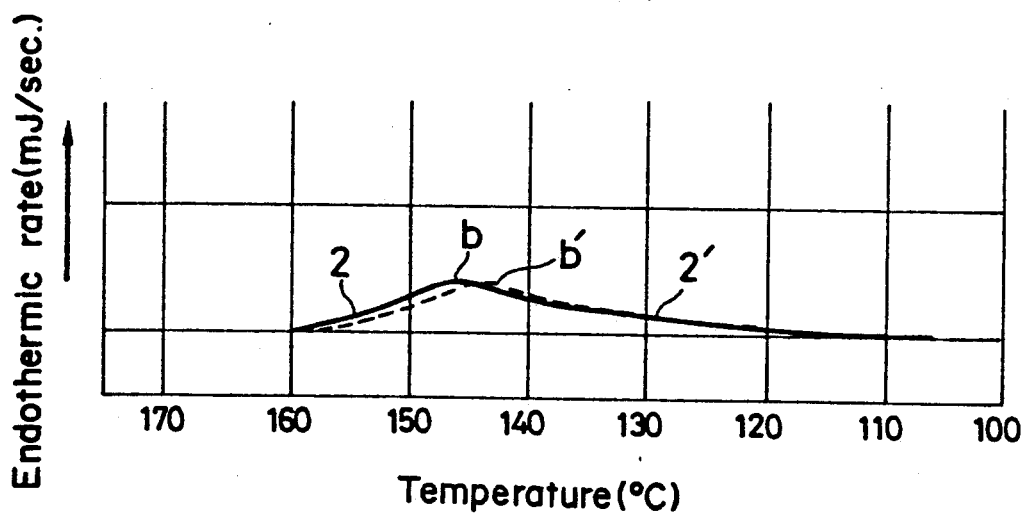
FIG. 2 shows a DSC curve of foamed particles containing no secondary crystals therein.

FIGS. 1 and 2 show DSC curves obtained by differential scanning calorimetry of foamed particles with and without secondary crystals, respectively. In FIGS. 1 and 2, curves 1 and 2 are DSC curves obtained by the first measurement, and curves " and 2' indicate DSC curves obtained by the second measurement. As shown in FIG. 1, a high-temperature peak A, which does not appear on the DSC curve 1' obtained by the second measurement, appears, in addition to an inherent peak B, on the DSC curve 1 obtained by the first measurement on the foamed particles containing the secondary crystals therein (On the curve 1' obtained by the second measurement, an inherent peak B' alone appears). The existence of the secondary crystals is ascertained by the appearance of this high-temperature peak A. With respect to the foamed particles containing no secondary crystals therein on the other hand, as shown in FIG. 2, inherent peaks b and b' only appear on the respective curves 2 and 2', but any high-temperature peak does not appear. The absence of the secondary crystals is confirmed by this fact.

Foamed polymer particles, in which the presence of secondary crystals is not recognized like the foamed particles shown in FIG. 2, are obtained in such a case that polymer particles are expanded at a temperature above a melting completion temperature of the polymer without subjecting them for a sufficient period of time to a heat treatment at a temperature to facilitate the formation of secondary crystals (the melting point of the polymer to the melting completion temperature) in a foaming process. On the other hand, foamed polymer particles containing secondary crystals such as those shown in FIG. 1 can generally be obtained, in the case of an uncrosslinked propylene polymer, by holding the polymer particles for a sufficient period of time, usually, 5-90 minutes, preferably, 10-60 minutes at a temperature not lower than about (the melting point of the polymer−20° C.) but lower than the melting completion temperature in a closed vessel without raising their temperature beyond the melting completion temperature. When secondary crystals are formed by holding the polymer particles at such a temperature, it is possible to obtain foamed particles excellent in moldability so long as the foaming temperature (the temperature of the polymer particles upon their release) at which the polymer particles are released into an atmosphere of a pressure lower than the internal pressure of the vessel to expand them is a temperature not higher than the temperature corresponding to a top of the above-described high-temperature peak even if it is not lower than the melting completion temperature of the polymer. Alternatively, in the case of an uncrosslinked, linear low-density polyethylene, it is only necessary in general to hold the polymer particles for a sufficient period of time, usually, 5-90 minutes, preferably, 5-30 minutes at a temperature not lower than about (the melting point of the polymer−15° C.) but lower than the melting completion temperature in a closed vessel without heating them to a temperature above the melting completion temperature.

Incidentally, when the polymer particles are held at the temperature to facilitate the formation of secondary crystals, it is desirable to hold them in plural steps at different temperatures in view of easiness of temperature control. In this case, a method in which a holding temperature in a subsequent step is made higher than that in a preceding step is used. It is desirable that a temperature should be adjusted in such a manner that the holding temperature in the last step is equal to the foaming temperature.

In the process according to this invention, the temperature at which the polymer particles impregnated with carbon dioxide are released into an atmosphere of a pressure lower than the internal pressure of the vessel to expand them (the foaming temperature) is a temperature not lower than the softening temperature of the polymer. In the case of particles of an uncrosslinked polymer in particular, temperatures near the melting point thereof are preferred. A suitable foaming temperature range varies depending on the type of each resin. In the case of an uncrosslinked polypropylene by way of example, temperatures within a range of from (the melting point $-5°$ C.) to (the melting point $+15°$ C.), particularly, from (the melting point $-3°$ C.) to (the melting point $+10°$ C.) are preferred. Besides, in the case of an uncrosslinked, linear low-density polyethylene, temperatures within a range of from (the melting point of the polymer $-10°$ C.) to (the melting point $+5°$ C.) are preferred. Furthermore, in the case of particles of a crosslinked polymer, temperatures not lower than the melting point of the polymer prior to crosslinking are preferred. The heating rate upon heating the polymer particles to the foaming temperature may preferably be $1°–10°$ C./min, particularly, $2°–5°$ C./min.

In this invention, the melting points, melting completion temperatures and softening temperatures of the above-described polymers are those as to polymers free of any adsorbents. The term "melting point" of a polymer as used herein means a temperature corresponding to a top of an endothermic peak (an inherent peak) on each of DSC curves obtained by heating about 6 mg of a polymer sample to 220° C. at a heating rate of 10° C./min by a differential scanning calorimeter, cooling the sample from 220° C. to about 50° C. at a cooling rate of 10° C./min and then heating it again to 220° C. at a heating rate of 10° C./min. The term "melting completion temperature" as used herein denotes a melting completion temperature in an endothermic peak (an inherent peak) on the second DSC curve obtained by the above-described measurement. The term "softening temperature" of a polymer as used herein means a softening temperature as determined under conditions of a load of 4.6 kg/cm$^2$ in accordance with the method of ASTM-D-648.

It is necessary for the foamable polymer particles to be held in a closed vessel under a pressure such as the particles are not expanded in the vessel, generally, under a pressure of at least 5 kg/cm$^2$.G.

In this invention, an inorganic gas such as nitrogen, air, argon or carbon dioxide may be fed like the conventional method in order to maintain the interior of the vessel at a high pressure. However, the advantageous effects of this invention become conspicuous when carbon dioxide is particularly used singly out of these gases.

EXAMPLES

The present invention will hereinafter be described in further detail by the following examples.

EXAMPLES 1-3:

Their corresponding adsorbents shown in Table 1 in amounts also given in Table 1 were each added to 100 parts by weight of a propylene-ethylene random copolymer (ethylene component: 2.3 wt. %, melting point: 146° C., melting completion temperature: 165° C.) in an extruder to melt and knead the resultant mixture. The thus-melted mixture was then extruded into a strand through a die on the tip of the extruder. The strand was quenched in water, followed by its chopping into particles of 2.4 mm long and 1.1 mm across. A closed vessel (volume: 400 l) was charged with 100 kg of the thus-obtained particles, 1 kg of tricalcium phosphate, 250 g of sodium dodecylbenzenesulfonate, 220 l of water and dry ice as a foaming agent in its corresponding amount shown in Table 1. While stirring the contents in the closed vessel, the contents were heated and held under their corresponding heating temperature conditions given in Table 1 without raising their temperature beyond a melting completion temperature of the copolymer. Thereafter, while applying a back pressure with carbon dioxide so as to maintain the interior of the vessel at the given temperature and pressure, the vessel was opened at one end thereof to release the copolymer particles and water under the atmospheric pressure, thereby expanding the copolymer particles. The average bulk expansion ratios and the maximum and minimum values of bulk expansion ratios of the thus-obtained respective foamed particles are shown collectively in Table 1.

COMPARATIVE EXAMPLE 1

Using the same propylene-ethylene random copolymer as those used in Examples 1-3 except that a silica-alumina adsorbent in which the molar ratio of SiO$_2$/Al$_2$O$_3$ was 1.14:1 was added thereto, foaming operation was carried out under its corresponding conditions shown in Table 1 in accordance with the procedure described in Examples 1-3. Properties of the thus-obtained foamed particles are shown in Table 1.

REFERENCE EXAMPLE 1

Using particles obtained by pelletizing the same propylene-ethylene random copolymer as those used in Examples 1-3 except no the silica-alumina adsorbent was added, foaming operation was carried out under its corresponding conditions shown in Table 1 in accordance with the procedure described in Examples 1-3. Properties of the thus-obtained foamed particles are shown in Table 1.

EXAMPLES 4-5

Respective polymer particles obtained by pelletizing in the same manner as in Examples 1-3 except that a propylene-butene random copolymer (butene component: 6.0 wt. %, melting point: 144° C., melting completion temperature: 163° C.) was used instead of the propylene-ethylene random copolymer and their corresponding adsorbents shown in Table 1 in amounts also given in Table 1 were used were expanded under their corresponding conditions shown in Table 1 in accordance with the procedure described in Examples 1-3.

Properties of the thus-obtained foamed particles are also shown collectively in Table 1.

COMPARATIVE EXAMPLE 2

Using particles obtained by pelletizing the same propylene-butene random copolymer as those used in Examples 4-5 except that an adsorbent having an $SiO_2/Al_2O_3$ content of 100 mol % was added thereto, foaming operation was carried out under its corresponding conditions shown in Table 1 in accordance with the procedure described in Examples 4-5. Properties of the thus-obtained foamed particles are also shown collectively in Table 1.

EXAMPLE 6

Foaming operation was carried out in the same manner as in Examples 1-3 except that an uncrosslinked, linear low-density polyethylene (comonomer: butene-1, density: 0.925 g/cm$^3$, MI: 1, melting point: 122° C., melting completion temperature: 133° C.) blended with its corresponding adsorbent shown in Table 1 was used. Properties of the thus-obtained foamed particles are shown in Table 1.

COMPARATIVE EXAMPLE 3

Foaming operation was carried out in the same manner as in Example 6 except that the adsorbent used in Example 6 was replaced with its corresponding adsorbent shown in Table 1. Properties of the thus-obtained foamed particles are shown in Table 1.

EXAMPLE 7

Foaming operation was carried out in the same manner as in Examples 1-3 except that particles of a low-density polyethylene resin (melting point prior to crosslinking: 107° C.) having a gel content of 55 wt. % and blended with its corresponding adsorbent shown in Table 1 were used. Properties of the thus-obtained foamed particles are shown in Table 1.

REFERENTIAL EXAMPLE 2

Foaming operation was carried out in the same manner as in Example 7 except that no adsorbent was added. Properties of the thus-obtained foamed particles are shown in Table 1.

TABLE 1

| | | Adsorbent added | | | Amount of foaming agent (dry ice) added (kg) | Heating temperature conditions | |
|---|---|---|---|---|---|---|---|
| | | Kind[*1] | Molar ratio of SiO$_2$/Al$_2$O$_3$ | Average particle size (μm) | Amount added (wt. part) | | Heating temperature (°C.) | Holding time (min) |
| Example | 1 | TAF-08 | 1.8:1 | 0.6 | 0.2 | 8 | 153 | 15 |
| | 2 | ZEOSTAR NA-100P | 1.18:1 | 3 | 1.0 | 5.5 | 153 | 15 |
| | 3 | MIZKASORB S-O | 49:1 | 1 | 0.5 | 8 | 153 | 15 |
| | 4 | SILTON JC-15 | 2.25:1 | 1 | 0.2 | 8 | 152 | 15 |
| | 5 | TAF-08 | 1.8:1 | 0.6 | 0.1 | 5.5 | 152 | 15 |
| | 6 | SILTON JC-15 | 2.25:1 | 1 | 0.5 | 11 | 118 | 15 |
| | 7 | SILTON JC-15 | 2.25:1 | 1 | 0.2 | 8 | 150 | 30 |
| Comp. Ex. | 1 | ZEOSTAR KA-110P | 1.14:1 | 3 | 1.0 | 5.5 | 153 | 15 |
| | 2 | Grinds of T-101 | Al$_2$O$_3$ 100% | 1 | 0.2 | 5.5 | 152 | 15 |
| | 3 | ZEOSTAR KA-110P | 1.14:1 | 3 | 0.2 | 11 | 118 | 15 |
| Ref. Ex | 1 | — | — | — | — | 8 | 153 | 15 |
| | 2 | — | — | — | — | 8 | 150 | 30 |

| | | Internal pressure of vessel during foaming (kg/cm$^2$ · G) | Foamed particles | | | |
|---|---|---|---|---|---|---|
| | | | Presence of secondary crystals | Average bulk expansion ratio (times) | Scatter of expansion ration | |
| | | | | | Maximum value (times) | Minimum value (times) |
| Example | 1 | 41 | Existed | 30.5 | 30.8 | 30.1 |
| | 2 | 35 | " | 26.4 | 27.5 | 26.0 |
| | 3 | 41 | " | 28.5 | 29.3 | 28.1 |
| | 4 | 41 | " | 30.5 | 30.8 | 30.2 |
| | 5 | 35 | " | 25.8 | 26.0 | 25.3 |
| | 6 | 47 | " | 9.8 | 10.0 | 9.5 |
| | 7 | 40 | Not existed | 22.5 | 22.8 | 22.1 |
| Comp. Ex. | 1 | 35 | Existed | 24.5 | 25.2 | 23.8 |
| | 2 | 35 | " | 23.2 | 24.0 | 22.8 |
| | 3 | 47 | " | 4.8 | 5.5 | 3.8 |
| Ref. Ex | 1 | 41 | " | 13.5 | 14.5 | 12.6 |
| | 2 | 41 | Not existed | 11 | 13 | 10.5 |

[*1] Both TAF-08 and SILTON JC-15 are trade names of snythetic zeolites produced by Mizusawa Industrial Chemicals, Ltd. MIZKASORB S-O is a trade name of an adsorbent containing silica gel as a predominant component and produced by the aforesaid company and was used as grinds. T-101 is a trade name of an activated alumina gel produced by Mizusawa Industrial Chemicals, Ltd. Both ZEOSTAR NA-100P AND ZEOSTAR KA-110P are trade names of zeolites produced by Nippon Chemical Industrial Co., Ltd.

What is claimed is:

1. A process for the production of foamed polymer particles, which comprises dispersing particles of a polymer, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel, thereby expanding the polymer particles.

2. A process for the production of foamed polymer particles, which comprises dispersing particles of an uncrosslinked propylene polymer, which contain a silica-alumina adsorbent in which the molar ratio of $SiO_2/Al_2O_3$ is at least 1.15:1 in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel at a temperature within a range of from (the melting point of the polymer−5° C.) to (the melting point+ 15° C.), thereby expanding the polymer particles.

3. A process for the production of foamed polymer particles, which comprises dispersing particles of an uncrosslinked, linear low-density polyethylene, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel at a temperature within a range of from (the melting point of the polymer−10° C.) to (the melting point+5° C.), thereby expanding the polymer particles.

4. A process for the production of foamed polymer particles, which comprises dispersing particles of a crosslinked polymer, which contain a silica-alumina adsorbent in which the molar ratio of $SiO_2/Al_2O_3$ is at least 1.15:1, in a dispersion medium in the presence of carbon dioxide in a closed vessel, heating the resultant dispersion to a temperature not lower than the softening temperature of the polymer to impregnate the polymer particles with carbon dioxide, and then releasing the polymer particles and the dispersion medium into an atmosphere of a pressure lower than the internal pressure of the vessel at a temperature not lower than the melting point of the polymer prior to crosslinking, thereby expanding the polymer particles.

5. The process as claimed in any one of claims 1-4, wherein the silica-alumina adsorbent contained in the polymer particles has a particle size of 50 μm or smaller.

6. The process as claimed in any one of claims 1-4, wherein the polymer particles contains the silica-alumina adsorbent in a proportion of 0.01-10 parts by weight per 100 parts by weight of the polymer.

7. The process as claimed in any one of claims 1-4, wherein the polymer particles containing the silica-alumina adsorbent have a particle size of 0.1-10 mm.

8. The process as claimed in any one of claims 1-4, wherein carbon dioxide is used in a proportion of 5-50 parts by weight per 100 parts by weight of the polymer particles containing the silica-alumina adsorbent.

9. The process as claimed in any one of claims 1-4, wherein carbon dioxide is fed to the closed vessel upon the release of the polymer particles impregnated with the foaming agent and the dispersion medium, thereby releasing them while maintaining the interior of the vessel at a high pressure.

* * * * *